US011932152B2

(12) United States Patent
Sakai et al.

(10) Patent No.: US 11,932,152 B2
(45) Date of Patent: Mar. 19, 2024

(54) AIR PUMP DEVICE AND SEAT APPARATUS

(71) Applicant: AISIN CORPORATION, Aichi (JP)

(72) Inventors: Shogo Sakai, Kariya (JP); Kazuma Nishida, Kariya (JP); Takashi Yokoyama, Kariya (JP); Satoshi Masuda, Kariya (JP)

(73) Assignee: AISIN CORPORATION, Aichi (JP)

(*) Notice: Subject to any disclaimer, the term of this patent is extended or adjusted under 35 U.S.C. 154(b) by 0 days.

(21) Appl. No.: 17/825,701

(22) Filed: May 26, 2022

(65) Prior Publication Data

US 2022/0379789 A1 Dec. 1, 2022

(30) Foreign Application Priority Data

May 28, 2021 (JP) ................................. 2021-090514

(51) Int. Cl.
B60N 2/90 (2018.01)
F04B 35/04 (2006.01)
F04B 39/00 (2006.01)
F04B 39/12 (2006.01)
F04B 53/00 (2006.01)
(Continued)

(52) U.S. Cl.
CPC ............ *B60N 2/914* (2018.02); *F04B 39/121* (2013.01); *F04B 1/03* (2020.01); *F04B 27/1081* (2013.01); *F04B 35/04* (2013.01); *F04B 39/0033* (2013.01); *F04B 39/0044* (2013.01);
(Continued)

(58) Field of Classification Search
CPC .......... B60N 2/914; F04B 39/121; F04B 1/03; F04B 27/10; F04B 27/1081; F04B 35/04; F04B 39/0033; F04B 39/0044; F04B 39/127; F04B 53/002; F04B 53/003
See application file for complete search history.

(56) References Cited

U.S. PATENT DOCUMENTS 5,274,200 A * 12/1993 Das ...................... E04B 1/8218
415/119
5,407,330 A * 4/1995 Rimington ............ F04D 29/602
417/313
(Continued)

FOREIGN PATENT DOCUMENTS

DE 102020122633 A1 * 3/2022
JP 2018025128 A 2/2018

OTHER PUBLICATIONS

DE102020122633 translation (Year: 2023).*

*Primary Examiner* — Charles G Freay
*Assistant Examiner* — David N Brandt
(74) *Attorney, Agent, or Firm* — BUCHANAN INGERSOLL & ROONEY PC

(57) ABSTRACT

An air pump device includes an electric pump unit including a pump mechanism and a motor configured to drive the pump mechanism, a case housing the electric pump unit, and a vibration-proof member interposed between the electric pump unit and the case. The vibration-proof member is a plate-shaped member made of an elastic resin material and is wound around the electric pump unit to wrap the electric pump unit therein. A part of the vibration-proof member is sandwiched between the electric pump unit and one of facing surfaces that are inner surfaces of the case and face each other inside the case. Another part of the vibration-proof member is sandwiched between the electric pump unit and the other one of the facing surfaces.

4 Claims, 11 Drawing Sheets

(51) Int. Cl.
*F04B 1/03* (2020.01)
*F04B 27/10* (2006.01)

(52) U.S. Cl.
CPC ........... *F04B 39/127* (2013.01); *F04B 53/002* (2013.01); *F04B 53/003* (2013.01)

(56) References Cited

U.S. PATENT DOCUMENTS

| | | | |
|---|---|---|---|
| 9,063,405 B2* | 6/2015 | Clawson | ............... F04D 25/084 |
| 2021/0276469 A1 | 9/2021 | Sakai et al. | |
| 2022/0381238 A1* | 12/2022 | Blendea | ................. B60N 2/914 |

* cited by examiner

AIR PUMP DEVICE AND SEAT APPARATUS

CROSS REFERENCE TO RELATED APPLICATIONS

This application is based on and claims priority under 35 U.S.C. § 119 to Japanese Patent Application 2021-090514, filed on May 28, 2021, the entire content of which is incorporated herein by reference.

TECHNICAL FIELD

This disclosure relates to an air pump device and a seat apparatus.

BACKGROUND DISCUSSION

In the related art, there is proposed a vehicle seat apparatus that can change a support shape of a seat and impart a massage effect to an occupant seated in the seat by inflating and deflating airbags (bladders) provided on an inner side of the seat (for example, JP 2018-25128A (Reference 1)).

The seat apparatus according to Reference 1 inflates the airbags by pressure-feeding air using an air pump device including a motor as a drive source. The air pump device includes the motor serving as the drive source, a pump mechanism driven by the motor, and a case housing the motor and the pump mechanism. In addition, in the air pump device, a vibration-proof member is interposed between the motor and the case or between the pump mechanism and the case to reduce an influence of vibration or noise generated by an operation of the motor or the pump mechanism. The above air pump device is provided with a plurality of vibration-proof members such as a cylindrical motor vibration-proof member extending around an axis of the motor, a cylindrical pump vibration-proof member extending around an axis of the pump mechanism, and plate-shaped vibration-proof members disposed at both ends of the motor and the pump mechanism in an axial direction.

In the configuration of the above related art, since the plurality of vibration-proof members, specifically, the motor vibration-proof member, the pump vibration-proof member, and the plate-shaped vibration-proof members are provided inside the case, a structure of the air pump device is complicated. Accordingly, an operation of assembling the air pump device is complicated.

A need thus exists for an air pump device and a seat apparatus which are not susceptible to the drawback mentioned above.

SUMMARY

According to an aspect of this disclosure, an air pump device includes: an electric pump unit including a pump mechanism and a motor configured to drive the pump mechanism; a case housing the electric pump unit; and a vibration-proof member interposed between the electric pump unit and the case, in which the vibration-proof member is a plate-shaped member made of an elastic resin material and is wound around the electric pump unit to wrap the electric pump unit therein, a part of the vibration-proof member is sandwiched between the electric pump unit and one of facing surfaces that are inner surfaces of the case and face each other inside the case, and another part of the vibration-proof member is sandwiched between the electric pump unit and the other one of the facing surfaces.

According to another aspect of this disclosure, a seat apparatus includes: the air pump device described above that pressure-feeds air to an airbag disposed on an inner side of a seat.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment of a pneumatic seat apparatus having a seat support function and a massage function and an air pump device thereof will be described with reference to the drawings.

Figure 1:
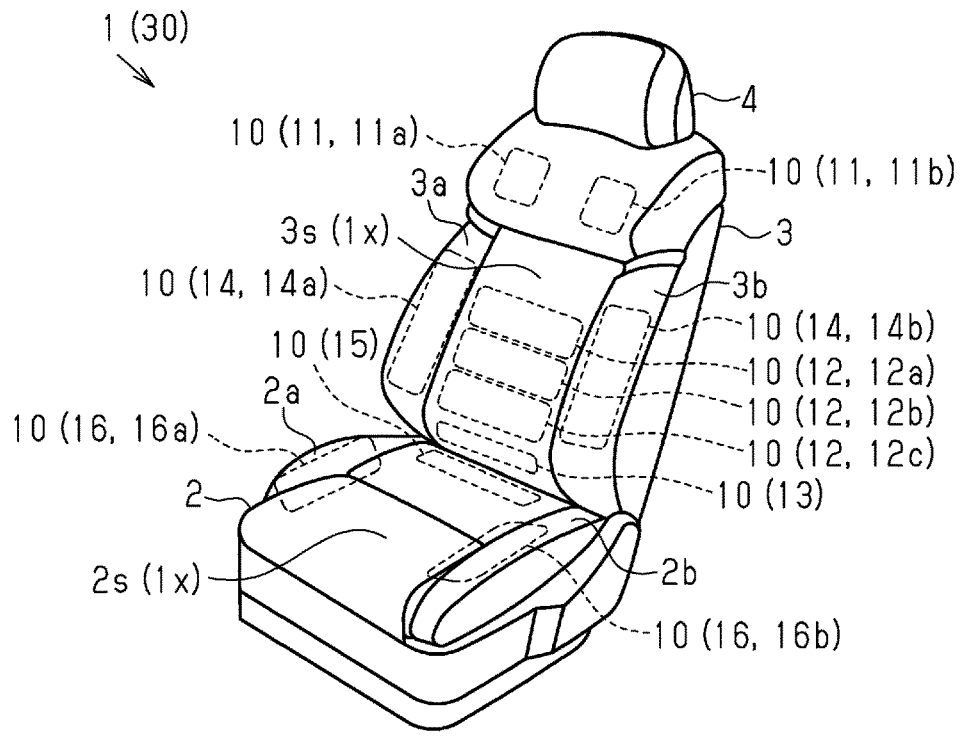
FIG. 1 is a perspective view (for seat support) of a vehicle seat provided with airbags on an inner side.
Figure 2:
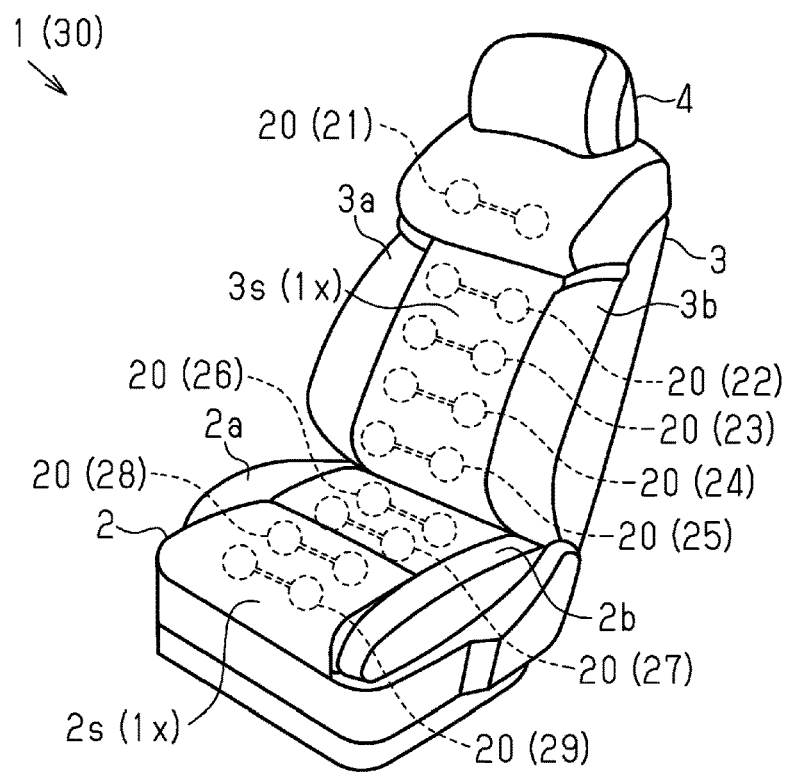
FIG. 2 is a perspective view (for massage) of the vehicle seat provided with the airbags on the inner side.

As shown in FIGS. 1 and 2, a seat 1 for a vehicle includes a seat cushion 2 and a seat back 3 provided at a rear end portion of the seat cushion 2. Further, the seat back 3 of the seat 1 is provided with a headrest 4 at an upper end.

In addition, in the seat 1 according to the present embodiment, the seat back 3 has a shape in which both side portions 3a and 3b of the seat back 3 protrude forward. In addition, the seat cushion 2 also has a shape in which both side portions 2a and 2b protrude upward. Accordingly, the seat 1 according to the present embodiment can ensure and maintain a good sitting posture of an occupant.

In addition, the seat 1 is provided with a plurality of airbags 10 (11 to 16) that change the surface shape of the seat 1 by inflating and deflating on inner sides of the seat cushion 2 and the seat back 3. In addition, the seat 1 is provided with a plurality of airbags 20 (21 to 29) that press a seat surface 1x of the seat 1 from an inner side similarly by inflating and deflating on the inner sides of the seat cushion 2 and the seat back 3. Accordingly, in the present embodiment, a seat apparatus 30 that can change a support shape of the seat 1 and impart a massage effect (refresh effect) to an occupant seated in the seat 1 is obtained.

Specifically, as shown in FIG. 1, in the seat 1 according to the present embodiment, the independent seat support airbags 11 (11a, 11b) are provided at a shoulder portion of a backrest surface 3s on the inner side of the seat back 3. The independent seat support airbags 12 (12a to 12c) and 13 are provided at positions corresponding to a lumbar portion and a lower end portion (back pelvis) of the seat back 3 on the inner side, respectively. In addition, the independent seat support airbags 14 (14a and 14b) are provided at positions corresponding to both the side portions 3a and 3b of the seat back 3. Further, the independent seat support airbags 15 and 16 (16a and 16b) are provided on an inner side of a rear end portion (cushion pelvis) and on inner sides of both the side portions 2a and 2b of a seating surface 2s of the seat cushion 2, respectively.

In addition, as shown in FIG. 2, the independent airbags 21 to 25 for massage (for refreshing) arranged in a vertical direction are provided from the shoulder portion to the lumbar portion and the lower end portion (back pelvis) of the backrest surface 3s on the inner side of the seat back 3. Each of the massage airbags 20 in the seat 1 according to the present embodiment has a structure in which a pair of bag bodies are separated from each other in a seat width direction and are connected to each other to integrally inflate and deflate. Further, the seat cushion 2 is further provided with the independent massage airbags 27 to 29 arranged in a front-rear direction below the seating surface 2s of the seat cushion 2.

Figure 3:
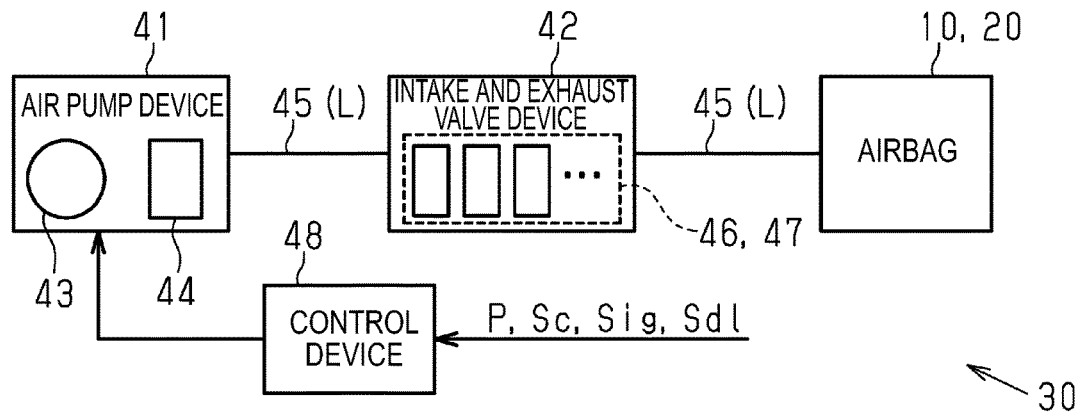
FIG. 3 is a schematic configuration diagram of a seat apparatus.

As shown in FIG. 3, the seat apparatus 30 according to the present embodiment includes an air pump device 41 that pressure-feeds air to each of the airbags 10 and 20, and an intake and exhaust valve device 42 interposed between the airbags 10, 20 and the air pump device 41. An electric pump that drives a pump mechanism 44 using a motor 43 as a drive source is used in the air pump device 41 according to the present embodiment. In addition, the intake and exhaust valve device 42 is connected to the airbags 10 and 20 and the air pump device 41 via flexible resin tubes 45. That is, in the seat apparatus 30 according to the present embodiment, an air flow passage L communicating with the airbags 10 and 20 and the air pump device 41 of the seat apparatus 30 is constituted by the tubes 45 and an internal passage of the intake and exhaust valve device 42. Accordingly, in the intake and exhaust valve device 42 according to the present embodiment, intake valves 46 and exhaust valves 47 are disposed in an intermediate portion of the flow passage L.

In addition, in the seat apparatus 30 according to the present embodiment, operations of the intake valves 46, the exhaust valves 47, and the air pump device 41 are controlled by a control device 48. Specifically, an internal pressure P of the airbags 10 and 20, an operation input signal Sc to an operation switch (not shown), an ignition signal Sig, a door lock signal Sdl, and the like are input to the control device 48 according to the present embodiment. Further, the control device 48 according to the present embodiment controls, based on these control signals, operations of the intake valves 46, the exhaust valves 47, and the air pump device 41 to inflate and deflate the airbags 10 and 20.

Next, the air pump device 41 according to the present embodiment will be described.

As shown in FIGS. 4 to 7, the air pump device 41 includes a case 50 housing the motor 43 and the pump mechanism 44 on an inner side. This case 50 has a substantially rectangular parallelepiped outer shape. The case 50 has a divided structure including a first divided case 51 and a second divided case 52 that each have a substantially box-like outer shape with a bottom.

Figure 7:
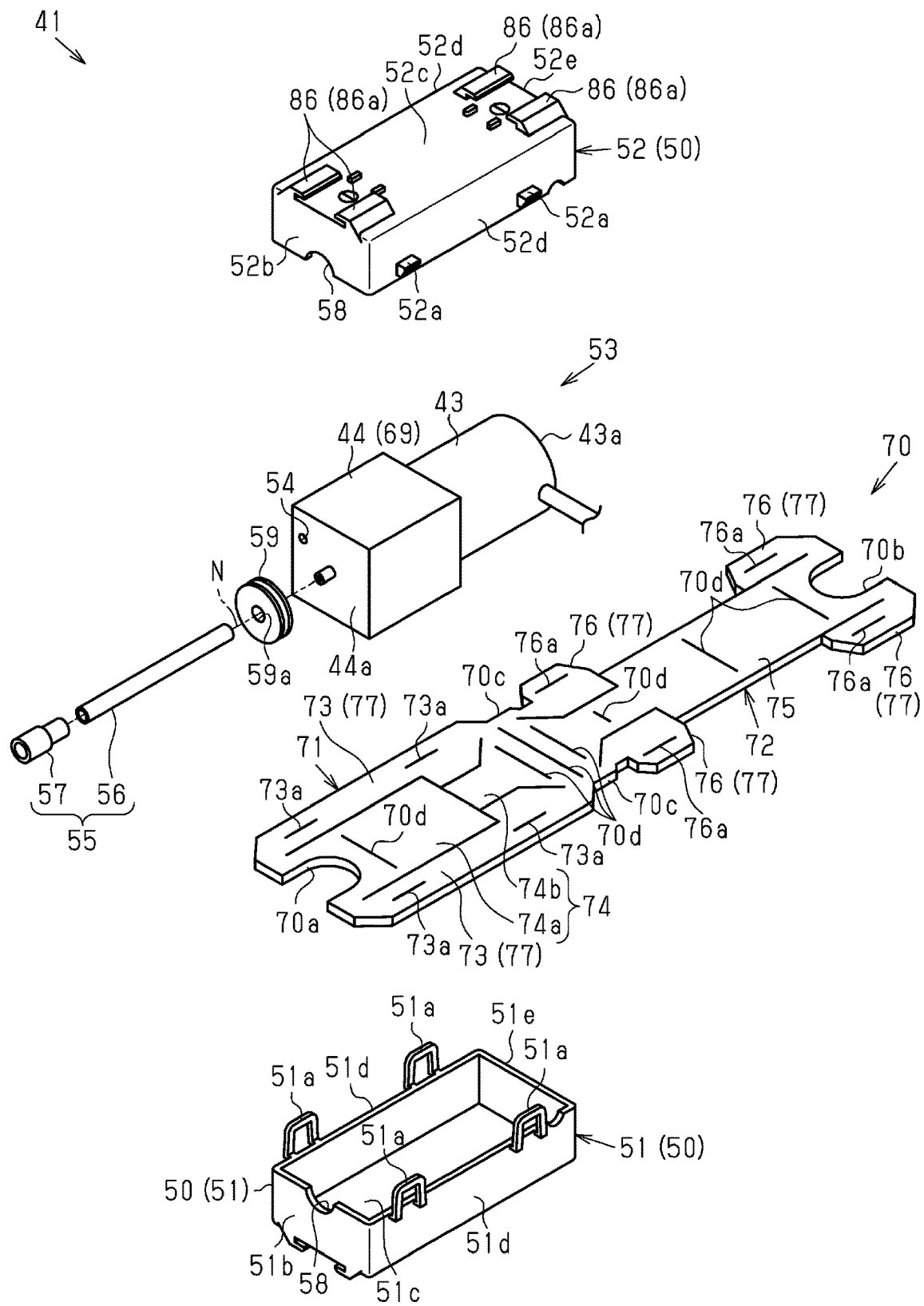
FIG. 7 is an exploded perspective view of the air pump device.

As shown in FIG. 7, four locking pieces 51a protrude from an outer surface of the first divided case 51. Each locking piece 51a extends along the outer surface of the first divided case 51 in a U-shape when viewed from a direction of facing the outer surface of the first divided case 51. Each locking piece 51a has a shape protruding from a joint portion of the first divided case 51 toward the second divided case 52 (an upper side in FIG. 7). The four locking pieces 51a are arranged on the outer surface of the first divided case 51 at positions corresponding to four corners of a rectangular shape. On the other hand, four locked portions 52a protrude from an outer surface of the second divided case 52. Each locked portion 52a is formed with a convex portion that engages with the locking piece 51a of the first divided case 51. The four locked portions 52a are arranged on the outer surface of the second divided case 52 at positions corresponding to four corners of a rectangular shape. In the air pump device 41 according to the present embodiment, the case 50 is formed by joining the first divided case 51 and the second divided case 52 through engagement between the four locking pieces 51a of the first divided case 51 and the four locked portions 52a of the second divided case 52.

Figure 4:
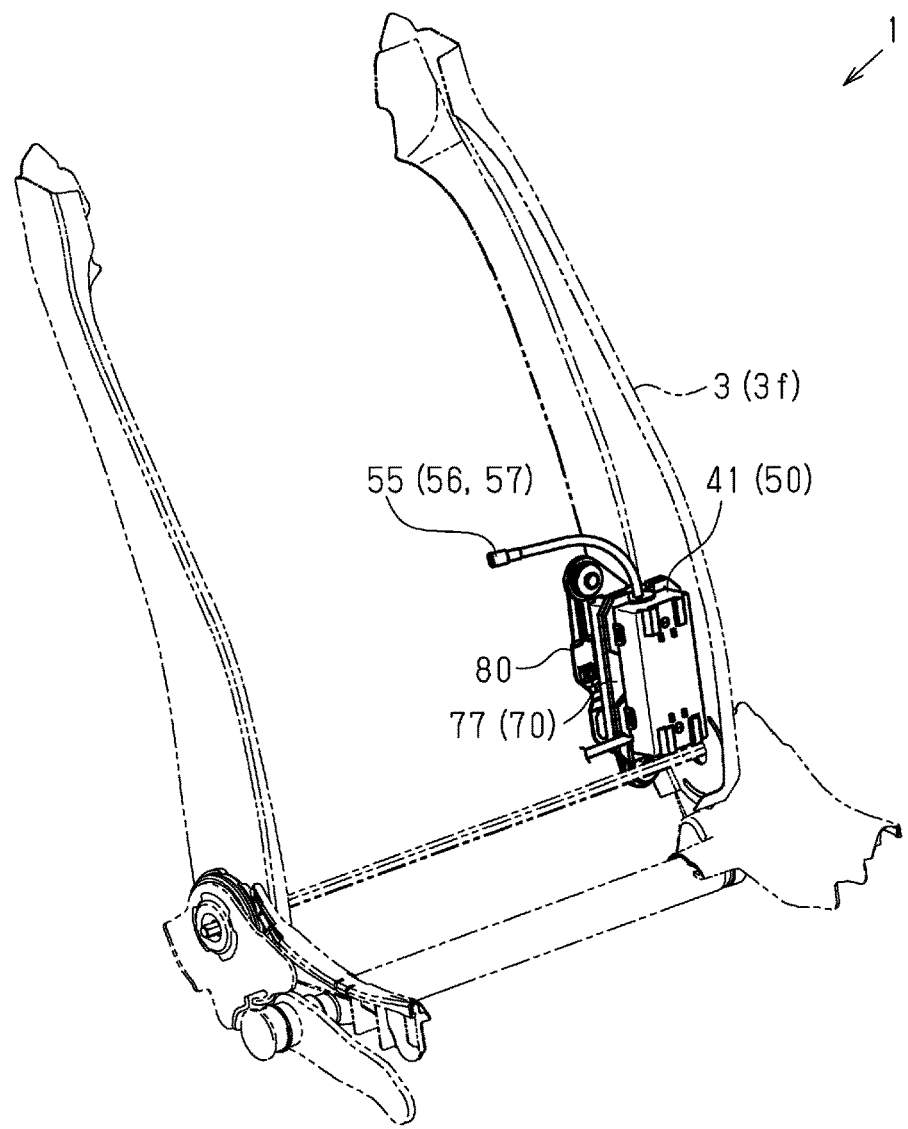
FIG. 4 is a perspective view of an air pump device disposed in the vicinity of a side frame of a seat back.

As shown in FIG. 4, in the seat apparatus 30 according to the present embodiment, the air pump device 41 is disposed on the inner side of the seat 1 and in the vicinity of a side frame 3f constituting a framework of the seat back 3 of the seat 1.

As shown in FIG. 7, in the air pump device 41 according to the present embodiment, the motor 43 and the pump mechanism 44 constitute an electric pump unit 53 obtained by integrating the motor 43 and the pump mechanism 44 such that the pump mechanism 44 is disposed in an axial direction of the motor 43. The motor 43 according to the present embodiment has a substantially cylindrical outer shape extending in the axial direction (indicated by N in FIG. 7) of the motor 43, and the pump mechanism 44 according to the present embodiment has a substantially quadrangular prism outer shape. Further, the electric pump unit 53 according to the present embodiment is housed on the inner side of the case 50 in a state in which the axis of the motor 43 extends along a longitudinal direction.

The pump mechanism 44 includes an air suction opening 54 at an axial end portion 44a opposite to the motor 43 in the axial direction of the motor 43. In the air pump device 41 according to the present embodiment, the suction opening 54 of the pump mechanism 44 is disposed on the inner side of the case 50.

In addition, the pump mechanism 44 has an air discharge opening 55 at the axial end portion 44a on a side where the suction opening 54 is provided. Specifically, in the pump mechanism 44 according to the present embodiment, the discharge opening 55 includes a tube 56 extending from the axial end portion 44a, and a joint 57 connected to a distal end of the tube 56. In addition, in the case 50 according to the present embodiment, a through hole 58 is provided in side walls 51b and 52b facing the axial end portion 44a of the pump mechanism 44 in which the discharge opening 55 is provided. In addition, a rubber bush 59 is fitted into the through hole 58. Further, in the air pump device 41 according to the present embodiment, the distal end of the tube 56 constituting the discharge opening 55 is drawn out to the outside of the case 50 through an insertion hole 59a provided in the rubber bush 59.

As shown in FIG. 4, the air pump device 41 according to the present embodiment is disposed such that an elongated shape of the electric pump unit 53 extending in the axial direction of the motor 43 is along the side frame 3f of the seat back 3. Accordingly, the tube 56 constituting the discharge opening 55 is drawn out to an upper side of the case 50.

Figure 8:
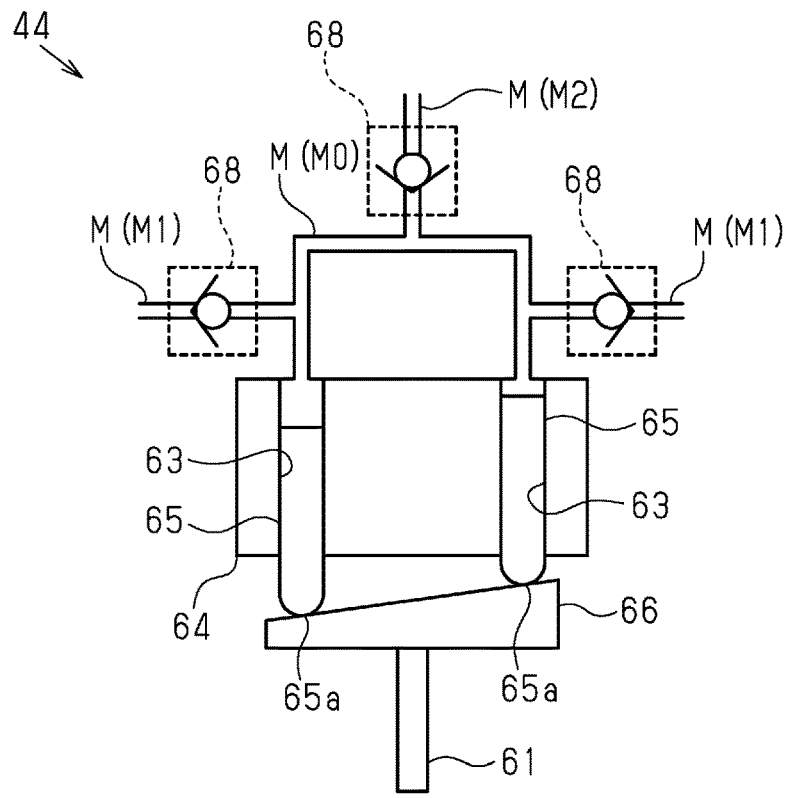
FIG. 8 is a schematic configuration diagram of a piston pump used in the air pump device.

As shown in FIG. 8, the pump mechanism 44 has a configuration as an axial piston pump. Specifically, the pump mechanism 44 includes a drive shaft 61 that is rotated by a driving force of the motor 43, and a cylinder block 64 including a plurality of cylinders 63 disposed at positions eccentric to the drive shaft 61. In addition, the pump mechanism 44 includes a plurality of pistons (plungers) 65 disposed in the corresponding cylinders 63 in a state in which proximal ends 65a of the pistons 65 protrude to the outside of the cylinder block 64. Further, the pump mechanism 44 includes a swash plate 66 that rotates together with the drive shaft 61 of the pump mechanism 44 in a state in which the proximal ends 65a of the pistons 65 are in contact with the swash plate 66.

That is, in the pump mechanism 44, contact positions of the pistons 65 with respect to the swash plate 66 are displaced in an axial direction of the drive shaft 61 by rotating the swash plate 66. Accordingly, the pistons 65 reciprocates in the corresponding cylinders 63.

In addition, a flow passage M that communicates the cylinders 63 with the suction opening 54 and the discharge opening 55 is provided in an end portion (an upper end portion in FIG. 8) of the cylinder block 64 opposite to the swash plate 66. In addition, in the flow passage M, check valves 68 that prevent backflow of air are provided in corresponding intermediate portions of branch lines M1 extending to the suction opening 54 and an intermediate portion of a branch line M2 extending to the discharge opening 55. The branch lines M1 and the branch line M2 branch from a main line M0 of the flow passage M. Accordingly, the pump mechanism 44 according to the present embodiment pumps air suctioned from the suction opening 54 from the discharge opening 55 based on a volume change of the cylinders 63 accompanying the reciprocating motion of the pistons 65.

In the pump mechanism 44, these components (61 to 68) are housed in a housing 69 having a substantially quadrangular prism shape (see FIG. 7). Specifically, in the housing 69, the cylinder block 64 is disposed such that the cylinders 63 extend along the axial direction (a vertical direction in FIG. 8) of the motor 43. Accordingly, a radial dimension of the pump mechanism 44 is reduced.

Figure 5:
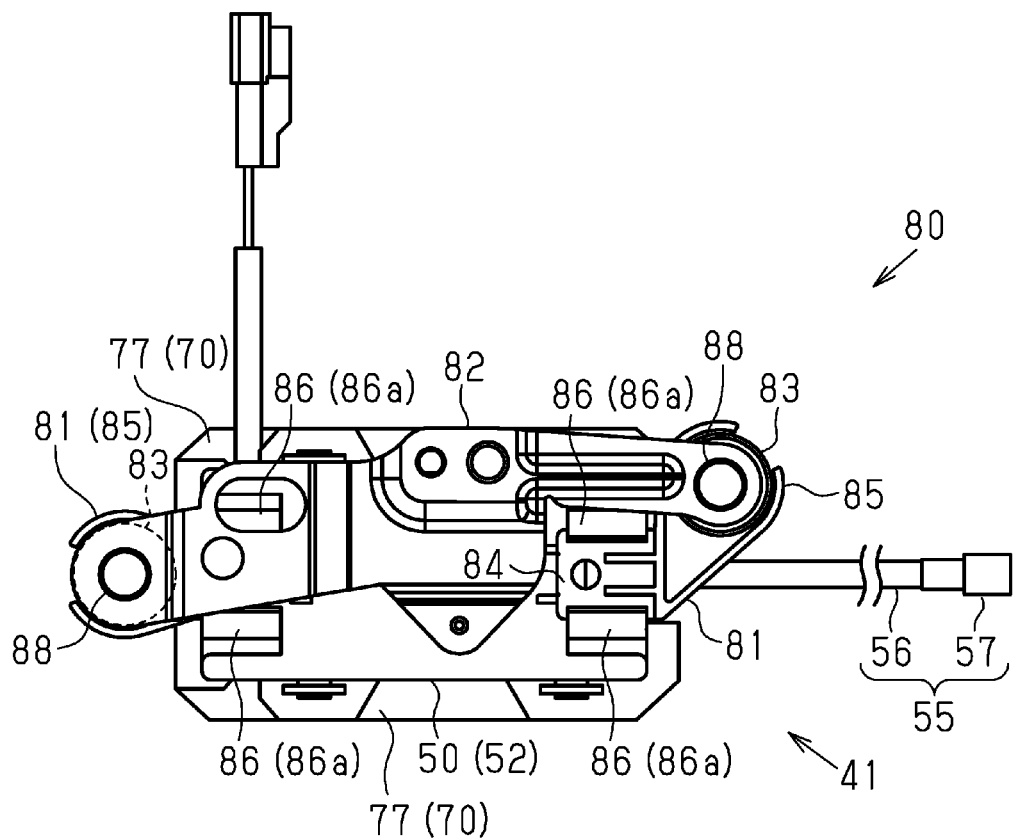
FIG. 5 is a plan view of the air pump device and a vibration-proof device.
Figure 6:
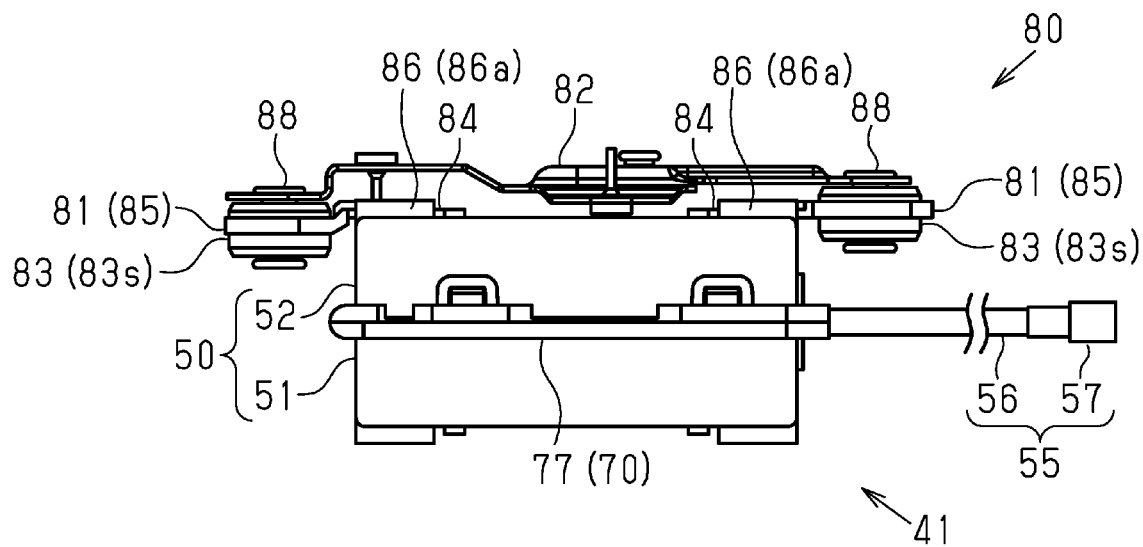
FIG. 6 is a side view of the air pump device and the vibration-proof device.

In addition, as shown in FIGS. 5 to 7, the air pump device 41 according to the present embodiment includes a vibration-proof member 70. The vibration-proof member 70 is interposed between an inner surface of the case 50 and an outer surface of the electric pump unit 53 and between the first divided case 51 and the second divided case 52. In the air pump device 41 according to the present embodiment, the vibration-proof member 70 absorbs vibration and noise generated by operations of the motor 43 and the pump mechanism 44.

Hereinafter, the vibration-proof member 70 will be described in detail.

First, a shape of the vibration-proof member 70 before attachment will be described.

Figure 9:
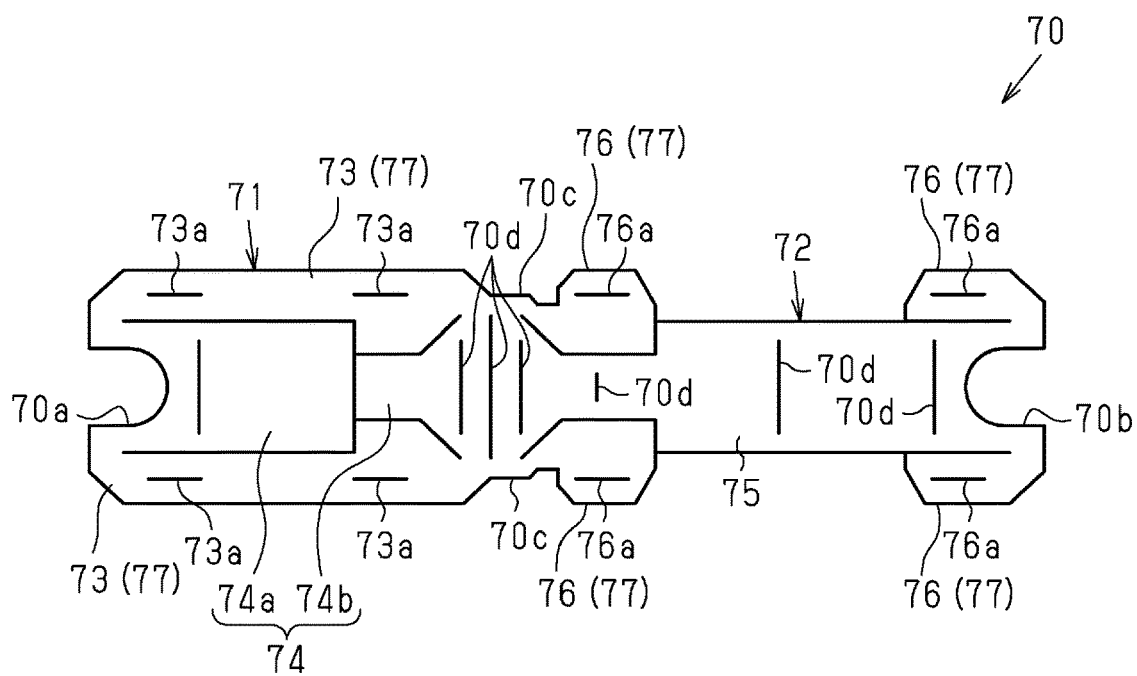
FIG. 9 is a plan view of a vibration-proof member before attachment.

As shown in FIGS. 7 and 9, the vibration-proof member 70 has an elongated flat plate shape in a free state before the attachment. The vibration-proof member 70 is formed of an elastic resin material (flame retardant urethane foam [UEI] in the present embodiment). The vibration-proof member 70 is wound around the electric pump unit 53

Cutout portions 70a and 70b, which are portions cut out into a U-shape, are provided at both ends of the vibration-proof member 70 in a longitudinal direction. The cutout portions 70a and 70b are formed at positions where the tube 56 and the rubber bush 59 are disposed in a state in which the air pump device 41 is assembled. By providing the cutout portions 70a and 70b in the vibration-proof member 70, unnecessary interference between the vibration-proof member 70 and the tube 56 and between the vibration-proof member 70 and the rubber bush 59 is prevented.

The vibration-proof member 70 includes a narrow portion 70c in the middle in the longitudinal direction. The narrow portion 70c has a shape in which a part of a width (a length in a vertical direction in FIG. 9) of the narrow portion 70c is narrowed. In the present embodiment, when the air pump device 41 is assembled, the vibration-proof member 70 is folded back at the narrow portion 70c. In the present embodiment, the vibration-proof member 70 is provided with the narrow portion 70c so that the vibration-proof member 70 is appropriately folded back.

The vibration-proof member 70 is provided with a plurality of slits 70d. The slits 70d each have a shape penetrating the vibration-proof member 70 in a thickness direction, and extend in a predetermined pattern. Each slit 70d is provided in a portion where the vibration-proof member 70 is bent when the air pump device 41 is assembled. An operation of bending the vibration-proof member 70 can be performed smoothly by providing the slits 70d in the vibration-proof member 70.

The vibration-proof member 70 includes a first portion 71 that constitutes one side (a left side in FIG. 9) in the longitudinal direction and a second portion 72 that constitutes the other side (a right side in FIG. 9).

The first portion 71 includes a first peripheral portion 73 constituting a peripheral edge portion of the first portion 71 and a first central portion 74 constituting a central portion.

The first peripheral portion 73 is provided with four first through holes 73a. Each of the first through holes 73a is a linear slit extending in the longitudinal direction. In the present embodiment, the four first through holes 73a provided in the first portion 71 of the vibration-proof member 70 and the four locking pieces 51a of the first divided case 51 (see FIG. 7) are arranged at positions corresponding to four corners of the same rectangular shape. When the air pump device 41 is assembled, the four locking pieces 51a of the first divided case 51 are inserted into the four first through holes 73a of the first portion 71 of the vibration-proof member 70, respectively.

The first central portion 74 includes a first pump portion 74a that constitutes a cutout portion 70a side, and a first motor portion 74b that constitutes a second portion 72 side.

The first pump portion 74a has a rectangular plate shape, and is in a state in which an end portion of the first pump portion 74a on the cutout portion 70a side (a left side in FIG. 9) is not cut or separated from the first peripheral portion 73, and the other portions are cut and separated from the first peripheral portion 73.

The first motor portion 74b has a plate shape, and is in a state in which an end portion (a right side in FIG. 9) of the first motor portion 74b on the second portion 72 side is not cut or separated from the first peripheral portion 73, and the other portions are cut and separated from the first peripheral portion 73. In the first motor portion 74b, a portion on a distal end side (the left side in FIG. 9) has a rectangular shape, and a portion on a proximal end side (the right side in FIG. 9) has a wide tapered shape toward a proximal end.

The second portion 72 of the vibration-proof member 70 has a second central portion 75 that constitutes a central portion in a width direction, and two pairs of second leg portions 76 that are provided at positions sandwiching the second central portion 75 in the width direction. Each of the second leg portions 76 is provided with a second through hole 76a. The second through hole 76a is a linear slit extending in the longitudinal direction. The four second leg portions 76 provided on the second portion 72 are disposed such that the second through holes 76a of the second leg portions 76 are formed at positions corresponding to four corners of a rectangular shape. In the present embodiment, when the air pump device 41 is assembled, the four locking pieces 51a of the first divided case 51 are inserted into the four second through holes 76a of the second portion 72 of the vibration-proof member 70, respectively.

Next, a procedure for assembling the air pump device 41 according to the present embodiment will be described.

When the air pump device 41 is assembled, first, a first process is performed.

First Process

Figure 10:
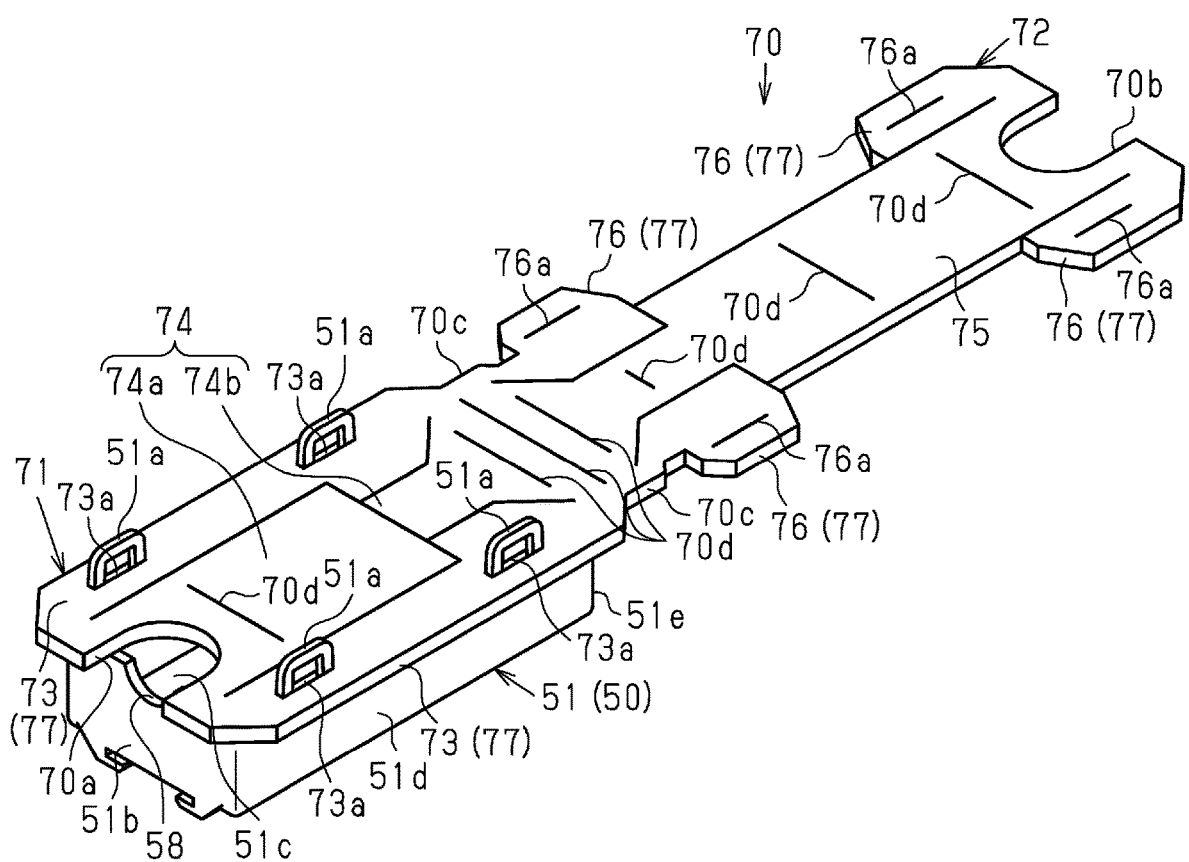
FIG. 10 is a schematic diagram showing a first process.

As shown in FIGS. 7, 9, and 10, in the first process, the vibration-proof member 70 is attached to the first divided case 51 such that the four locking pieces 51a of the first divided case 51 are inserted into the four first through holes 73a of the first portion 71 of the vibration-proof member 70, respectively. In this way, in the present embodiment, the vibration-proof member 70 can be positioned and attached to the first divided case 51 by an easy operation of inserting the four locking pieces 51a into the four first through holes 73a, respectively.

Second Process

After the first process, a second process is performed.

Figure 11:
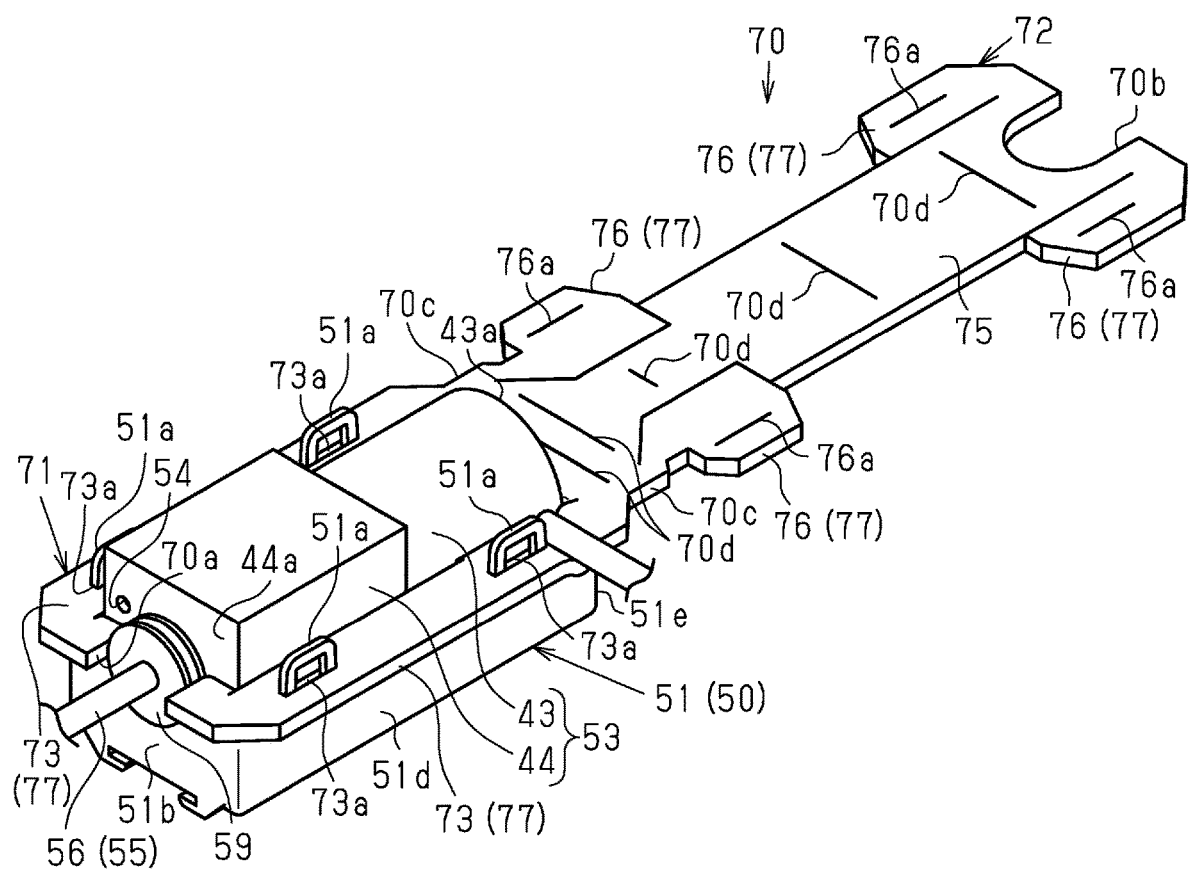
FIG. 11 is a schematic diagram showing a second process.

As shown in FIGS. 7, 9, and 11, in the second process, a substantially half of the electric pump unit 53 is fitted into the first divided case 51 such that the first central portion 74 of the first portion 71 of the vibration-proof member 70 is pushed into the first divided case 51.

Specifically, the pump mechanism 44 of the electric pump unit 53 is attached such that a portion (the first pump portion 74a) of the first central portion 74 of the vibration-proof member 70 on the cutout portion 70a side is pushed into the first divided case 51.

Figure 12:
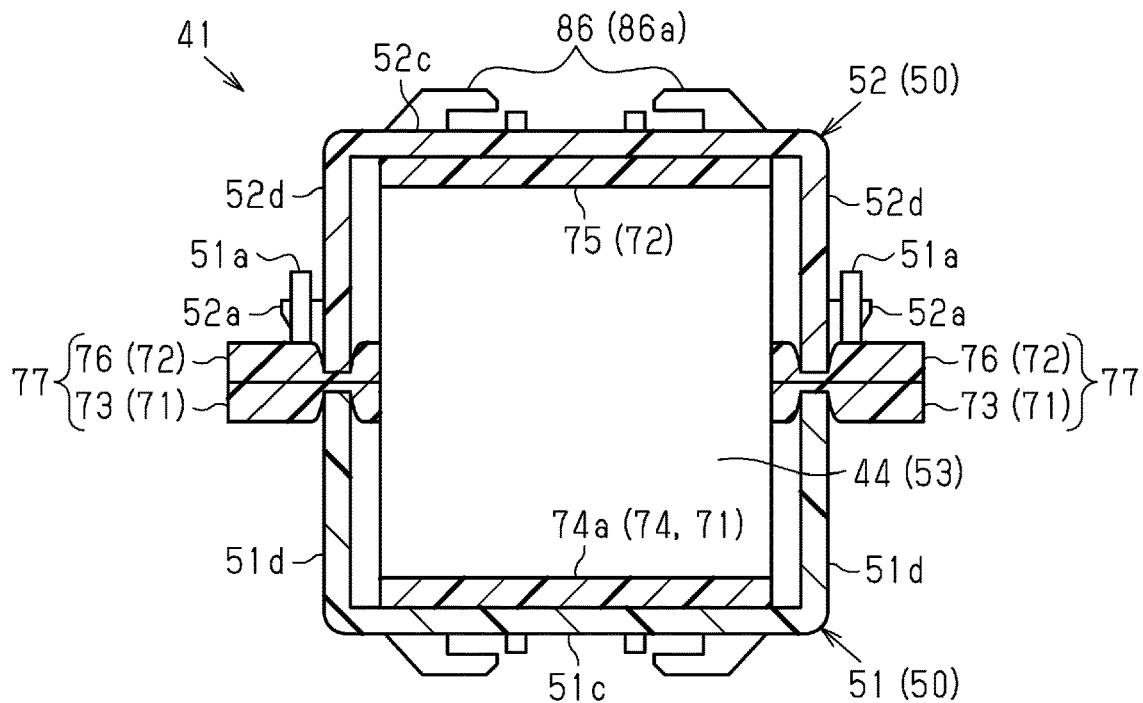
FIG. 12 is a cross-sectional view showing an internal structure of the air pump device in a portion where a pump mechanism is disposed.
Figure 13:
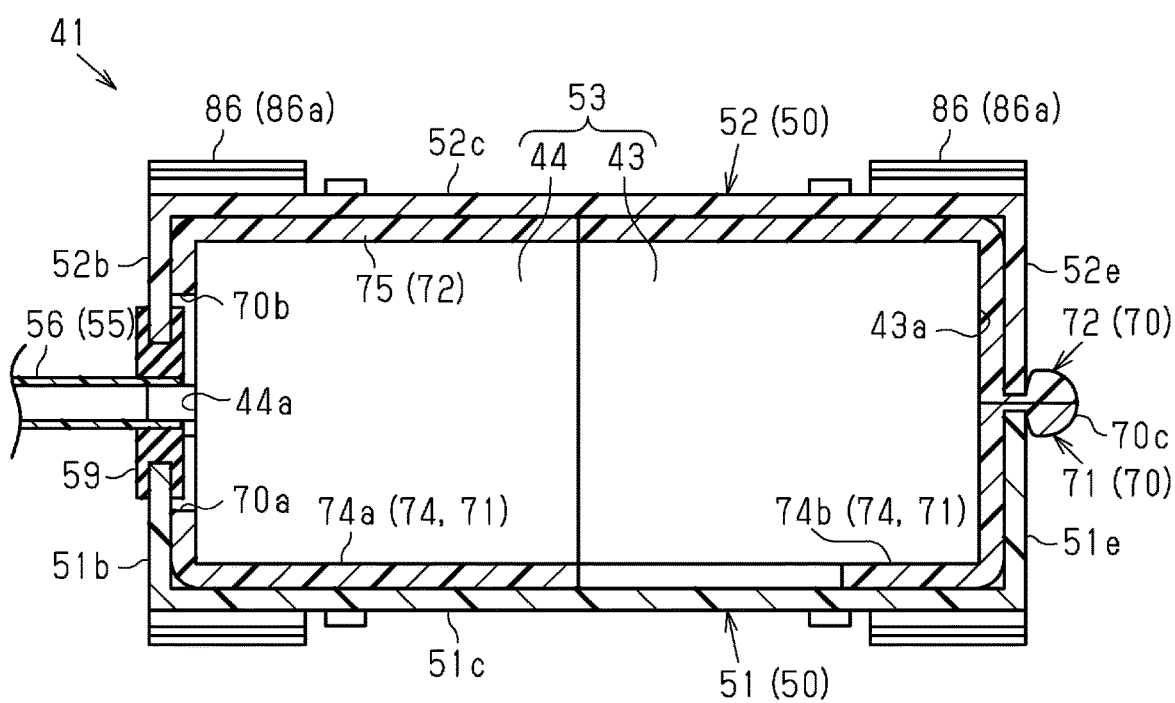
FIG. 13 is a cross-sectional view of the air pump device in an axial direction.

As shown in FIGS. 12 and 13, when the pump mechanism 44 is attached, a portion of the first pump portion 74a of the vibration-proof member 70 is sandwiched between the axial end portion 44a of the pump mechanism 44 and a portion (the side wall 51b) of the first divided case 51 that faces the axial end portion 44a. At this time, the other portions of the first pump portion 74a of the vibration-proof member 70 are sandwiched between a bottom wall 51c of the first divided case 51 and an outer surface of the pump mechanism 44. Accordingly, contact between inner surfaces of the side wall 51b and the bottom wall 51c of the first divided case 51 and the outer surface of the pump mechanism 44 is prevented. In addition, the pump mechanism 44 is sandwiched between inner surfaces of the first peripheral portion 73 of the first portion 71 of the vibration-proof member 70 in a state in which a gap is defined between two side walls 51d of the first divided case 51 in a width direction (a left-right direction in FIG. 12). Accordingly, contact between the outer surface of the pump mechanism 44 and the inner surfaces of the two side walls 51d of the first divided case 51 is prevented.

On the other hand, as shown in FIGS. 7, 9, and 11, the motor 43 of the electric pump unit 53 is attached such that a portion (the first motor portion 74b) of the first central portion 74 of the vibration-proof member 70 on the second portion 72 side is pushed into the first divided case 51.

Figure 14:
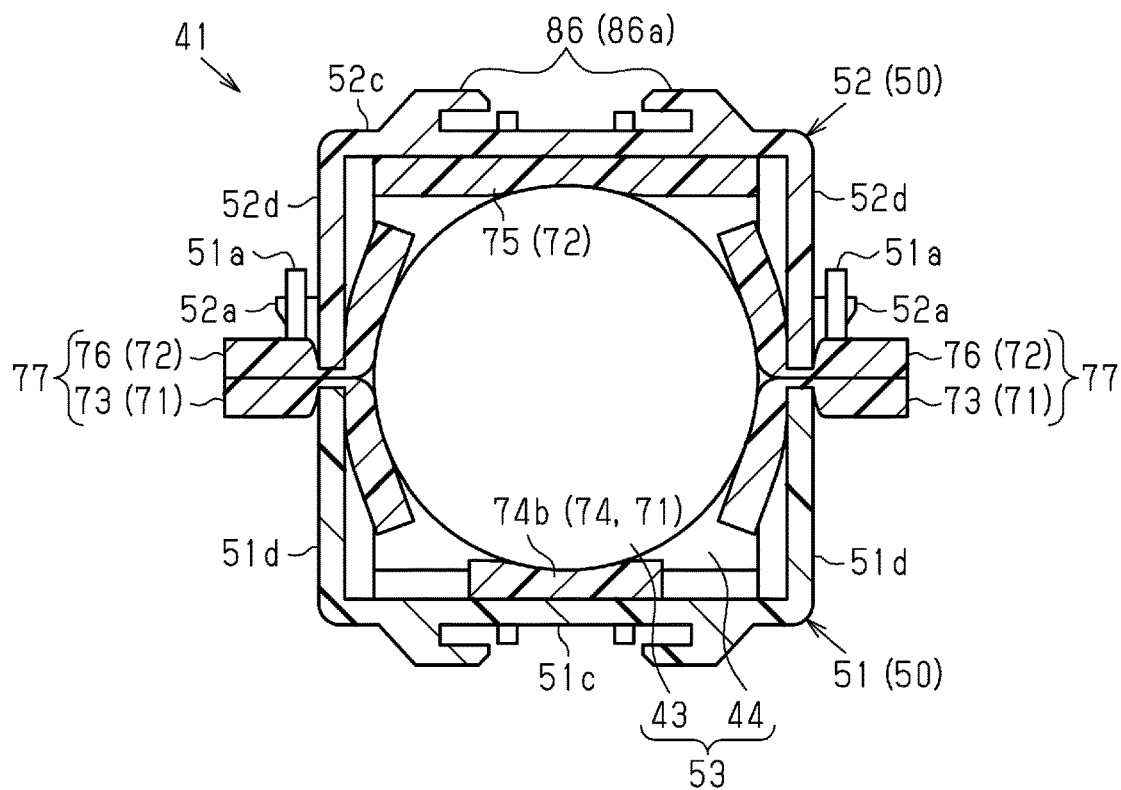
FIG. 14 is a cross-sectional view showing an internal structure of the air pump device in a portion where a motor is disposed.

As shown in FIGS. 13 and 14, a part of the first motor portion 74b of the vibration-proof member 70 is sandwiched between the axial end portion 43a of the motor 43 on an opposite side of the pump mechanism 44 in the axial direction and a portion (a side wall 51e) of the first divided case 51 that faces the axial end portion 43a. In addition, at this time, the other portions of the first motor portion 74b of the vibration-proof member 70 are sandwiched between the bottom wall 51c of the first divided case 51 and the outer surface of the motor 43. Accordingly, contact between inner surfaces of the side wall 51e and the bottom wall 51c of the first divided case 51 and the outer surface of the motor 43 is prevented. In the present embodiment, the first central portion 74 of the first portion 71 corresponds to a part of the vibration-proof member that is sandwiched between the inner surface of the case and the electric pump unit. In addition, in the present embodiment, the inner surface of the bottom wall 51c of the first divided case 51 corresponds to one of facing surfaces facing each other inside the case.

In addition, as shown in FIG. 14, when the motor 43 is attached, an outer peripheral surface of the motor 43 presses an inner edge portion of the first peripheral portion 73 of the vibration-proof member 70 toward the inside of the first divided case 51. In addition, at this time, the inner edge portion of the first peripheral portion 73 of the vibration-proof member 70 is sandwiched between the outer peripheral surface of the motor 43 and the inner surfaces of the two side walls 51d of the first divided case 51. Accordingly, on both sides of the motor 43 in the width direction, the inner edge portion of the first peripheral portion 73 of the vibration-proof member 70 is pressed to the outer peripheral surface of the motor 43. Therefore, the contact between the outer peripheral surface of the motor 43 and the inner surfaces of the two side walls 51d of the first divided case 51 is prevented, and the motor 43 is firmly supported by the inner edge portion of the first peripheral portion 73 of the vibration-proof member 70 inside the first divided case 51.

Third Process

After the second process, a third process is performed.

Figure 15:
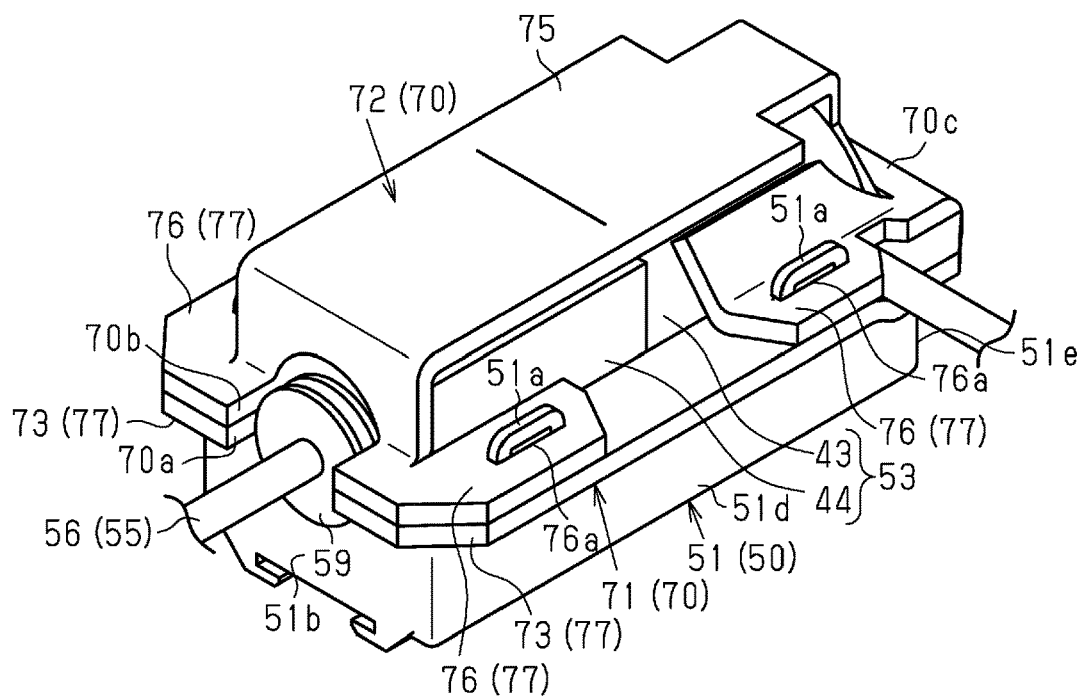
FIG. 15 is a schematic diagram showing a third process.

As shown in FIGS. 7, 9, and 15, in the third process, the vibration-proof member 70 is folded back at a portion (the narrow portion 70c) between the first portion 71 and the second portion 72. In addition, the second central portion 75 of the second portion 72 of the vibration-proof member 70 is bent to have a hat-shaped cross section such that the second central portion 75 extends in the axial direction along the outer surface of the electric pump unit 53. In addition, in this state, the four second leg portions 76 of the second portion 72 are overlapped with the first peripheral portion 73 of the first portion 71, and the second through holes 76a of these second leg portions 76 are inserted into the four locking pieces 51a of the first divided case 51, respectively. In this way, in the present embodiment, the second portion 72 of the vibration-proof member 70 can be attached to a predetermined position by an easy operation of bending the vibration-proof member 70 along the outer surface of the electric pump unit 53 and inserting the four locking pieces 51a into the four second through holes 76a.

Fourth Process

After the third process, a fourth process is performed.

Figure 16:
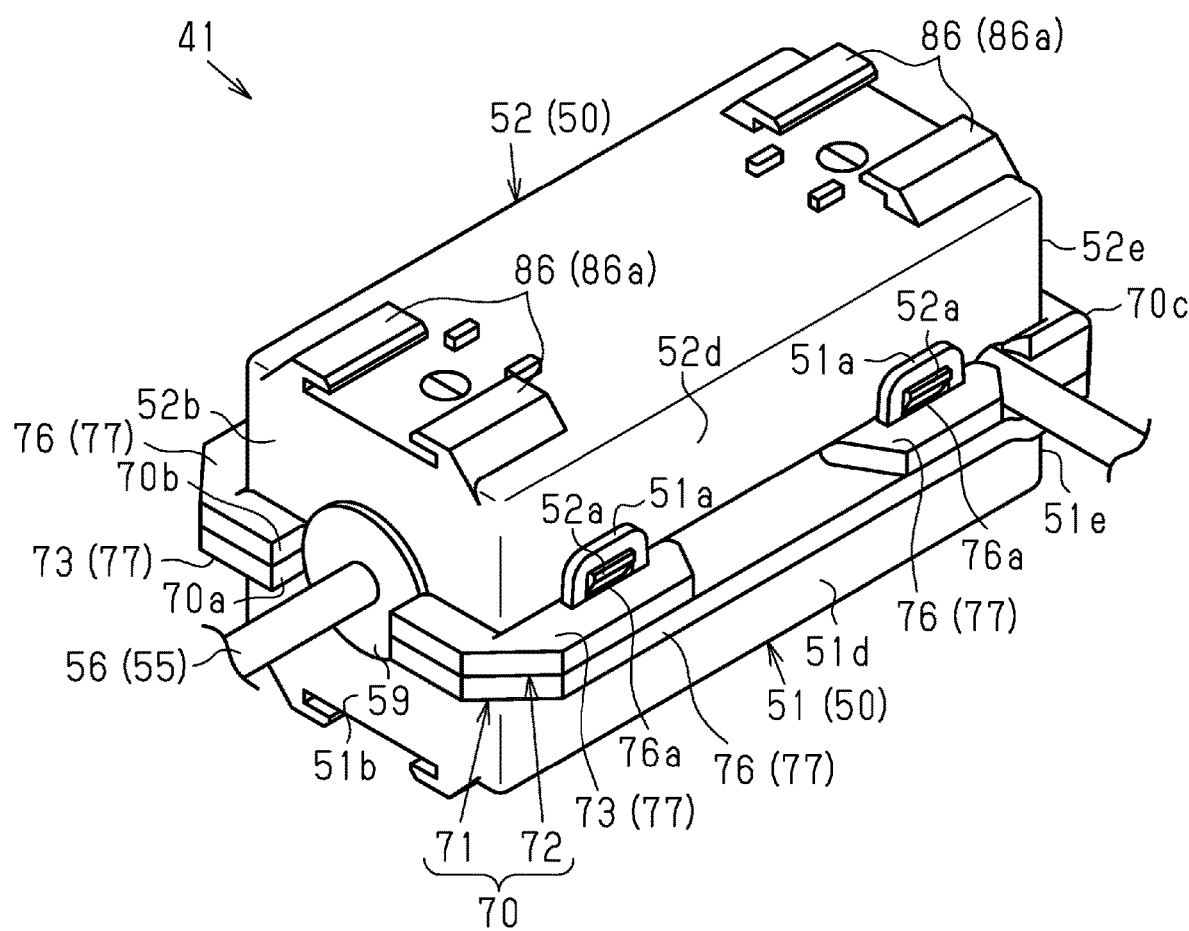
FIG. 16 is a schematic diagram showing a fourth process.

As shown in FIGS. 7, 15, and 16, in the fourth process, the second divided case 52 is attached to the first divided case 51 such that the four locking pieces 51a of the first divided case 51 are engaged with the four locked portions 52a of the second divided case 52, respectively.

As shown in FIGS. 12 and 13, when the second divided case 52 is assembled in this way, the second central portion 75 of the second portion 72 of the vibration-proof member 70 is sandwiched between the inner surface of the second divided case 52 and the outer surface of the electric pump unit 53. Specifically, a portion of the second central portion 75 on the cutout portion 70b side (a left side in FIG. 13) is sandwiched between the axial end portion 44a of the pump mechanism 44 and a portion (the side wall 52b) of the second divided case 52 that faces the axial end portion 44a. In addition, a central portion of the second central portion 75 in a longitudinal direction (a left-right direction in FIG. 13) is sandwiched between the bottom wall 52c of the second divided case 52 and the outer surface of the electric pump unit 53. In addition, a portion of the second central portion 75 on a folded portion (the narrow portion 70c) side is sandwiched between the axial end portion 43a of the motor 43 and a portion (the side wall 52e) of the second divided case 52 that faces the axial end portion 43a. Accordingly, contact between the outer surface of the electric pump unit 53 and the side walls 52b, 52e and the bottom wall 52c of the second divided case 52 is prevented. In the present embodiment, the second central portion 75 of the second portion 72 corresponds to another portion of the vibration-proof member that is sandwiched between the inner surface of the case and the electric pump unit. In addition, in the present embodiment, the inner surface of the bottom wall 52c of the second divided case 52 corresponds to another one of the facing surfaces facing each other inside the case. In addition, the pump mechanism 44 is sandwiched between inner surfaces of the pair of second leg portions 76 of the second portion 72 that are provided at positions sandwiching the pump mechanism 44 in a state in which a gap is defined between the two side walls 52d of the second divided case 52 in the width direction (the left-right direction in FIG. 12). Accordingly, contact between the outer surface of the pump mechanism 44 and the inner surface of the second divided case 52 is prevented.

On the other hand, as shown in FIG. 14, inner edge portions of the pair of second leg portions 76 of the second portion 72 that are provided at positions sandwiching the motor 43 are pressed toward the inside of the second divided case 52 by the outer peripheral surface of the motor 43. In addition, at this time, the inner edge portions of the pair of second leg portions 76 are sandwiched between the outer peripheral surface of the motor 43 and the inner surfaces of the two side walls 52d of the second divided case 52. Accordingly, on both sides of the motor 43 in the width direction, the inner edge portions of the second leg portions 76 of the vibration-proof member 70 are pressed to the outer peripheral surface of the motor 43. Therefore, contact between the outer peripheral surface of the motor 43 and the inner surfaces of the two side walls 52d of the second divided case 52 is prevented, and the motor 43 is firmly supported by the inner edge portions of the second leg portions 76 of the vibration-proof member 70 inside the second divided case 52.

In the air pump device 41 according to the present embodiment, the electric pump unit 53 is housed inside the case 50 including the first divided case 51 and the second divided case 52 in this way. As shown in FIGS. 12 to 14, in the present embodiment, inside the case 50, the vibration-proof member 70 is wound around the electric pump unit 53 to wrap the electric pump unit 53 therein.

In the air pump device 41 according to the present embodiment, the first peripheral portion 73 of the first portion 71 of the vibration-proof member 70 and the four second leg portions 76 of the second portion 72 are sandwiched between the first divided case 51 and the second divided case 52. The first peripheral portion 73 of the first portion 71 and the four second leg portions 76 of the second portion 72 constitute a sandwiched portion 77 interposed between the first divided case 51 and the second divided case 52 in a manner of extending in a joint portion of the first divided case 51 and the second divided case 52. The sandwiched portion 77 blocks a portion between the first divided case 51 and the second divided case 52 in a state in which a part of the sandwiched portion 77 is compressed between the first divided case 51 and the second divided case 52. Since sound leakage from the joint portion of the first divided case 51 and the second divided case 52 is reduced by providing such a sandwiched portion 77, an effect of reducing noise is obtained.

Here, when the second divided case 52 is fitted to the first divided case 51 in the fourth process, the sandwiched portion 77 of the vibration-proof member 70 is required to be compressed by a predetermined amount between the first divided case 51 and the second divided case 52. Therefore, depending on a shape (for example, thickness) of the sandwiched portion 77, a large force is required when the second divided case 52 is fitted to the first divided case 51.

For this point, in the air pump device 41 according to the present embodiment, a portion of the sandwiched portion 77 between the two second leg portions 76 of the vibration-proof member 70 that are adjacent to each other in a longitudinal direction is constituted by the first portion 71 alone. Accordingly, a thickness of the portion of the sandwiched portion 77 between the two second leg portions 76 of the vibration-proof member 70 that are adjacent to each other in the longitudinal direction is smaller than a thickness of the other portions. Therefore, in the air pump device 41 according to the present embodiment, as compared with a configuration in which the second portion 72 is also disposed on the portion between the two second leg portions 76, the sandwiched portion 77 of the vibration-proof member 70 can be compressed by a necessary amount with a small force. Therefore, an operation of attaching the second divided case 52 to the first divided case 51 and an operation of assembling the air pump device 41 can be easily performed.

Next, a fixing structure of the air pump device 41 in the seat apparatus 30 will be described.

Figure 17:
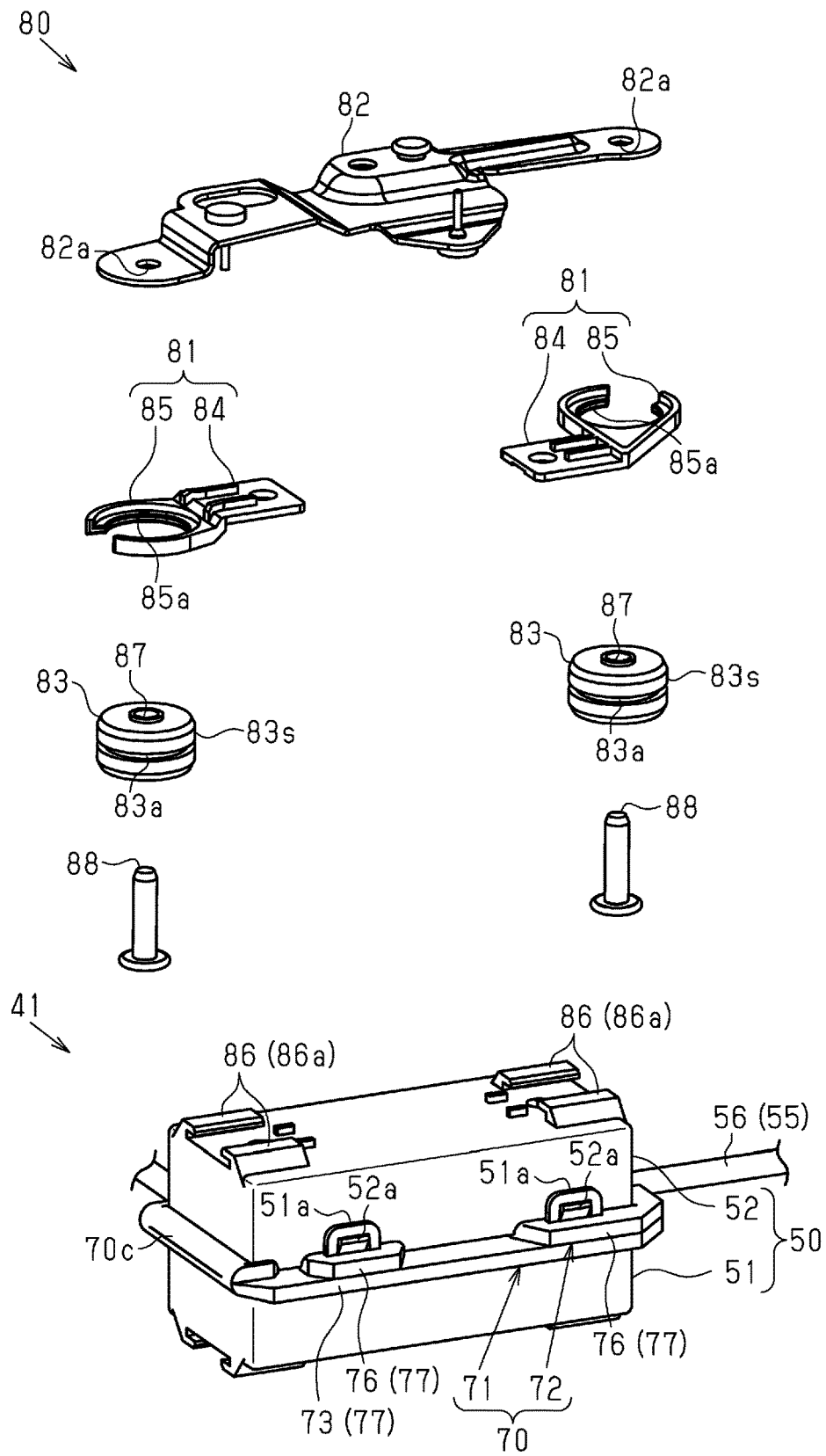
FIG. 17 is an exploded perspective view of the vibration-proof device.

As shown in FIGS. 5, 6, and 17, the seat apparatus 30 according to the present embodiment includes a vibration-proof device 80 interposed between the air pump device 41 and the seat 1 (a framework of the seat back 3).

Specifically, the vibration-proof device 80 according to the present embodiment includes a pair of mounting brackets 81 that are locked to the case 50 of the air pump device 41, and an intermediate bracket 82 that is locked to a fixing bracket (not shown) provided on a frame side of the seat back 3. In addition, the vibration-proof device 80 includes a pair of rubber bushes 83 interposed between the mounting brackets 81 and the intermediate bracket 82.

Each of the mounting brackets 81 according to the present embodiment includes a substantially flat plate-shaped pump engagement portion 84, and a substantially C-ring shaped bush engagement portion 85 provided at one end of the pump engagement portion 84. In addition, each of the rubber bushes 83 according to the present embodiment has a substantially flat cylindrical outer shape. In addition, an engagement groove 83*a* extending over an entire circumference of an outer peripheral surface 83*s* of each rubber bush 83 is provided. Further, the bush engagement portion 85 of the mounting bracket 81 is provided with a substantially C-ring shaped engagement protrusion 85*a* protruding radially inward from an inner periphery of the bush engagement portion 85.

That is, the bush engagement portion 85 of the mounting bracket 81 in the present embodiment engages with the outer peripheral surface 83*s* of the rubber bush 83 in a state in which the engagement protrusion 85*a* is disposed in the engagement groove 83*a* of the rubber bush 83. In addition, the air pump device 41 according to the present embodiment includes bracket locking portions 86 at both end portions of the case 50 in the longitudinal direction. Specifically, each of the bracket locking portions 86 includes a pair of locking pieces 86*a* that each has an outer shape with a substantially L-shaped cross section and face each other in a lateral direction of the case 50. Further, each of the mounting brackets 81 according to the present embodiment is locked to a corresponding end portion of the case 50 in the longitudinal direction in a state in which the pump engagement portion 84 is sandwiched between the two locking pieces 86*a*.

On the other hand, the intermediate bracket 82 according to the present embodiment has a substantially elongated plate-shaped outer shape having through holes 82*a* in both ends in the longitudinal direction. In addition, the rubber bush 83 according to the present embodiment is provided with a through hole 87 in a state that the through hole 87 penetrates an axial center portion of the substantially cylindrical shape. In addition, in the vibration-proof device 80 according to the present embodiment, clamping pins 88 are inserted through the corresponding through holes 82*a* of the intermediate bracket 82 and the through hole 87 of each rubber bush 83, respectively. Further, in the vibration-proof device 80 according to the present embodiment, by clamping both ends of each clamping pin 88, the pair of rubber bushes 83 are interposed between the intermediate bracket 82 and the mounting brackets 81.

That is, in the vibration-proof device 80 according to the present embodiment, each of the rubber bushes 83 elastically deforms to allow relative displacement between the intermediate bracket 82 and each of the mounting brackets 81 in an axial direction and a radial direction of each of the clamping pins 88. In addition, based on an elastic force (an elastic restoring force) of each rubber bush 83, a relative displacement amount generated between the intermediate bracket 82 and each of the mounting brackets 81 is attenuated. Accordingly, the vibration-proof device 80 according to the present embodiment absorbs vibration generated in the air pump device 41.

As described above, according to the present embodiment, operational effects described below are obtained.

(1) The air pump device 41 includes the vibration-proof member 70 interposed between the outer surface of the electric pump unit 53 and the inner surface of the case 50. The vibration-proof member 70 is a plate-shaped member made of an elastic resin material and is wound around the electric pump unit 53 to wrap the electric pump unit 53 therein. The first portion 71 of the vibration-proof member 70 is sandwiched between the electric pump unit 53 and the bottom wall 51*c* of the first divided case 51. In addition, the second portion 72 of the vibration-proof member 70 is sandwiched between the electric pump unit 53 and the bottom wall 52*c* of the second divided case 52.

According to the air pump device 41 according to the present embodiment, the vibration-proof member 70 wound around the electric pump unit 53 and housed inside the case 50 can prevent contact between the inner surface of the case 50 and the outer surface of the electric pump unit 53 at each portion inside the case 50. Further, the vibration-proof member 70 can absorb displacement of the electric pump unit 53 in the case 50. In addition, by providing the vibration-proof member 70, an effect of absorbing sound generated by an operation of the electric pump unit 53 (specifically, the motor 43 and the pump mechanism 44) and an effect of blocking the sound and reducing sound leakage to the outside of the case 50 can be obtained. Therefore, according to the air pump device 41 according to the present embodiment, an influence of vibration or noise generated by the operations of the motor 43 and the pump mechanism 44 can be reduced and a high quietness can be obtained.

Such a configuration can be implemented by providing one vibration-proof member 70 in a state of wrapping the electric pump unit 53. Therefore, the structure of the air pump device 41 can be simplified as compared with a structure in which a plurality of vibration-proof members having various shapes are provided in the case 50.

(2) The case 50 has a divided structure including the first divided case 51 and the second divided case 52. Further, the vibration-proof member 70 includes the sandwiched portion 77 extending in the joint portion of the first divided case 51 and the second divided case 52 and interposed between the first divided case 51 and the second divided case 52.

According to the air pump device 41, although the case 50 having the divided structure is adopted, a gap between the first divided case 51 and the second divided case 52 can be filled with the sandwiched portion 77 of the vibration-proof member 70. Accordingly, sound leakage from the inside to the outside of the case 50 through the gap between the first divided case 51 and the second divided case 52 can be reduced, and therefore a high quietness can be obtained.

(3) The four locking pieces 51*a* protrude from the first divided case 51. The four locked portions 52*a* are formed on the outer surface of the second divided case 52. In the case 50, the first divided case 51 and the second divided case 52 are joined to each other through the engagement between the four locking pieces 51*a* and the four locked portions 52*a*. The sandwiched portion 77 of the vibration-proof member 70 includes the through holes 73*a* and 76*a* through which the locking pieces 51*a* of the first divided case 51 are inserted. Specifically, the four first through holes 73*a* are formed in the first peripheral portion 73 of the first portion 71 constituting the sandwiched portion 77, and the second through holes 76*a* are formed in the four second leg portions 76 of the second portion 72 constituting the sandwiched portion 77, respectively.

According to the air pump device 41, the vibration-proof member 70 can be positioned and attached to the first divided case 51 by an easy operation of inserting the four locking pieces 51*a* of the first divided case 51 into the four first through holes 73*a* of the vibration-proof member 70. Furthermore, the second portion 72 of the vibration-proof member 70 can be attached to a predetermined position by an easy operation of bending the vibration-proof member 70 along the outer surface of the electric pump unit 53 and inserting the four locking pieces 51*a* into the four second through holes 76*a*.

In this way, the vibration-proof member 70 can be assembled to a proper position in the case 50 through an easy operation of inserting the locking pieces 51a of the first divided case 51 into the through holes 73a and 76a of the vibration-proof member 70. Therefore, the air pump device 41 can be easily assembled. Furthermore, since the through holes 73a and 76a of the vibration-proof member 70 and the locking pieces 51a of the case 50 are engaged with each other, displacement of the vibration-proof member 70 with respect to the case 50 can be prevented.

(4) The slits 70d extending in a predetermined pattern are formed in the vibration-proof member 70. Accordingly, when the vibration-proof member 70 is bent at the time of assembling the vibration-proof member 70, a bent shape of the vibration-proof member 70 can be appropriately controlled by the predetermined slits 70d. Therefore, the vibration-proof member 70 can be easily assembled.

The above embodiment can be modified and implemented as follows. The above embodiment and the following modifications can be implemented in combination with each other within a technically consistent range. As a structure in which the first divided case 51 and the second divided case 52 are jointed, any structure can be adopted, such as a structure in which a protruding piece protruding from the outer surface of one of the first divided case 51 and the second divided case 52 is welded to the outer surface of the other one of the first divided case 51 and the second divided case 52.

When the first divided case 51 and the second divided case 52 have shapes that can house the electric pump unit 53 while wrapping the electric pump unit 53 by the vibration-proof member 70, the shapes can be changed freely.

Assuming the sandwiched portion 77 of the vibration-proof member 70 is formed into a shape that does not interfere with the joining of the first divided case 51 and the second divided case 52, a part of the four through holes 73a and 76a through which the locking pieces 51a of the first divided case 51 are inserted may be omitted in the sandwiched portion 77. In addition, in the sandwiched portion 77 of the vibration-proof member 70, all of the four through holes 73a and 76a may be omitted.

When the vibration-proof member 70 is wound around the electric pump unit 53 inside the case 50, the sandwiched portion 77 that is a portion of the vibration-proof member 70 interposed between the first divided case 51 and the second divided case 52 may be omitted.

In the above embodiment, the pump mechanism 44 is a piston pump including the cylinders 63 extending along the axial direction of the motor 43, and the type of the pump mechanism 44 may be changed freely.

The slits 70d are not limited to a shape that penetrates the vibration-proof member 70 in the thickness direction, and can have a shape that extends to an intermediate portion of the vibration-proof member 70 in the thickness direction.

A formation pattern of the slits 70d in the vibration-proof member 70 can be changed freely.

In the above embodiment, the mounting brackets 81 of the vibration-proof device 80 are engaged with the outer peripheral surfaces 83s of the rubber bushes 83. In addition, the intermediate bracket 82 of the vibration-proof device 80 locks the clamping pins 88 and the rubber bushes 83 in a state that the rubber bushes 83 are elastically deformable in the axial direction and the radial direction of the clamping pins 88. The disclosure is not limited thereto, and the intermediate bracket 82 may engage with the outer peripheral surfaces 83s of the rubber bushes 83, and the mounting brackets 81 may lock the clamping pins 88 and the rubber bushes 83 in a state in which the rubber bushes 83 are elastically deformable in the axial direction and the radial direction of the clamping pins 88.

In addition, the number of the rubber bushes 83 may be one or three or more. Further, when a plurality of rubber bushes 83 are provided, the rubber bushes 83 are preferably arranged at positions separated from each other in the longitudinal direction of the air pump device 41.

In the above embodiment, the air pump device 41 is disposed along the side frame 3f on the inner side of the seat back 3, and an arrangement form of the air pump device 41 may be changed freely, and for example, the air pump device 41 may be disposed on the inner side of the seat cushion 2.

According to an aspect of the disclosure, an air pump device includes: an electric pump unit including a pump mechanism and a motor configured to drive the pump mechanism; a case housing the electric pump unit; and a vibration-proof member interposed between the electric pump unit and the case, in which the vibration-proof member is a plate-shaped member made of an elastic resin material and is wound around the electric pump unit to wrap the electric pump unit therein, a part of the vibration-proof member is sandwiched between the electric pump unit and one of facing surfaces that are inner surfaces of the case and face each other inside the case, and another part of the vibration-proof member is sandwiched between the electric pump unit and the other one of the facing surfaces.

According to the above configuration, the vibration-proof member wound around the electric pump unit and housed inside the case can prevent contact between the inner surface of the case and an outer surface of the electric pump unit at each portion inside the case. Accordingly, an influence of vibration or noise generated by operations of the motor and the pump mechanism can be reduced and a high quietness can be obtained. Furthermore, since such a configuration can be implemented by providing one vibration-proof member wrapping the electric pump unit, the air pump device can be simplified as compared with a structure in which a plurality of vibration-proof members having various shapes are provided in the case.

In the above air pump device, the case may have a divided structure including a first divided case and a second divided case, and the vibration-proof member may include a sandwiched portion extending in a joint portion of the first divided case and the second divided case and interposed between the first divided case and the second divided case.

According to the above configuration, although a case having a divided structure is adopted, a gap between the first divided case and the second divided case is filled with the sandwiched portion of the vibration-proof member, and therefore, sound leakage from the inside to the outside of the case through the gap can be reduced. Accordingly, a high quietness can be obtained.

In the above air pump device, the case may have a structure in which the first divided case and the second divided case are joined to each other through engagement between a locking piece protruding from one of the first divided case and the second divided case and a locked portion provided on an outer surface of the other one of the first divided case and the second divided case, and the sandwiched portion of the vibration-proof member may have a through hole through which the locking piece is inserted.

According to the above configuration, since the vibration-proof member can be assembled at a proper position in the case through an easy operation of inserting the locking piece into the through hole in the sandwiched portion of the vibration-proof member, the air pump device can be easily assembled. Since the through hole of the vibration-proof member and the locking piece of the case are engaged with each other, displacement of the vibration-proof member with respect to the case can be prevented.

In the above air pump device, the vibration-proof member may have a slit extending in a predetermined pattern.

According to the above configuration, when the vibration-proof member is bent at the time of assembling the vibration-proof member, a bent shape of the vibration-proof member can be appropriately controlled by the predetermined slit. Therefore, the vibration-proof member can be easily assembled.

According to another aspect of this disclosure, a seat apparatus includes: the air pump device described above that pressure-feeds air to an airbag disposed on an inner side of a seat.

According to this disclosure, a vehicle seat excellent in quietness can be implemented with a simple structure.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An air pump device comprising:
an electric pump unit including a pump mechanism and a motor configured to drive the pump mechanism;
a case housing the electric pump unit; and
a vibration-proof member interposed between the electric pump unit and the case, wherein
the vibration-proof member is made of an elastic resin material and is wound around the electric pump unit to wrap the electric pump unit therein,
a part of the vibration-proof member is sandwiched between the electric pump unit and one of a plurality of facing surfaces that are inner surfaces of the case and face each other inside the case,
another part of the vibration-proof member is sandwiched between the electric pump unit and an other one of the plurality of facing surfaces,
the case has a divided structure including a first divided case and a second divided case,
the vibration-proof member includes a sandwiched portion extending in a joint portion of the first divided case and the second divided case and interposed between the first divided case and the second divided case,
the case has a structure in which the first divided case and the second divided case are joined to each other through engagement between a locking piece protruding from one of the first divided case and the second divided case and a locked portion provided on an outer surface of the other one of the first divided case and the second divided case, and
the sandwiched portion of the vibration-proof member has a through hole through which the locking piece is inserted.

2. The air pump device according to claim 1, wherein the vibration-proof member has a slit extending in a predetermined pattern.

3. A seat apparatus comprising:
an airbag disposed on an inner side of a seat; and
the air pump device according to claim 1 that pressure-feeds air to the airbag.

4. The air pump device according to claim 1, wherein the sandwiched portion is compressed directly between the first divided case and the second divided case.

* * * * *